United States Patent
Sreekanth et al.

(10) Patent No.: US 10,533,749 B2
(45) Date of Patent: Jan. 14, 2020

(54) EFFUSION COOLING HOLES

(71) Applicant: PRATT & WHITNEY CANADA CORP., Longueuil (CA)

(72) Inventors: Sri Sreekanth, Mississauga (CA); Si-Man Lao, North York (CA); Michael Leslie Clyde Papple, Verdun (CA)

(73) Assignee: Pratt & Whitney Cananda Corp., Longueuil, Quebec (CA)

( * ) Notice: Subject to any disclaimer, the term of this patent is extended or adjusted under 35 U.S.C. 154(b) by 647 days.

(21) Appl. No.: 14/923,594

(22) Filed: Oct. 27, 2015

(65) Prior Publication Data
US 2017/0115006 A1    Apr. 27, 2017

(51) Int. Cl.
*F02C 1/00* (2006.01)
*F23R 3/16* (2006.01)

(52) U.S. Cl.
CPC ...... *F23R 3/16* (2013.01); *F23R 2900/03041* (2013.01)

(58) Field of Classification Search
CPC .. F23R 2900/03045; F23R 2900/03041; F05D 2260/2212; F05D 2260/226; F05D 2260/2214; F05D 2260/22141; F05D 2260/202
See application file for complete search history.

(56) References Cited

U.S. PATENT DOCUMENTS

| 4,380,906 | A  |    | 4/1983  | Dierberger |           |
|-----------|----|----|---------|------------|-----------|
| 4,622,821 | A  |    | 11/1986 | Madden     |           |
| 6,190,120 | B1 | *  | 2/2001  | Thatcher   | F01D 5/187 |
|           |    |    |         |            | 415/115   |
| 6,254,347 | B1 | *  | 7/2001  | Shaw       | B23H 9/10 |
|           |    |    |         |            | 416/97 R  |
| 6,305,904 | B1 | *  | 10/2001 | Weigand    | F01D 5/187 |
|           |    |    |         |            | 416/96 A  |
| 6,359,254 | B1 |    | 3/2002  | Brown      |           |
| 6,412,268 | B1 | *  | 7/2002  | Cromer     | F01D 9/023 |
|           |    |    |         |            | 60/760    |
| 6,573,474 | B1 |    | 6/2003  | Loringer   |           |
| 6,705,831 | B2 |    | 3/2004  | Draper     |           |
| 7,137,776 | B2 |    | 11/2006 | Draper et al. |        |
| 7,351,036 | B2 |    | 4/2008  | Liang      |           |
| 7,820,267 | B2 |    | 10/2010 | Fahndrich  |           |
| 8,057,181 | B1 | *  | 11/2011 | Liang      | F01D 5/186 |
|           |    |    |         |            | 416/97 R  |
| 2001/0016162 | A1 | * | 8/2001 | Lutum     | F01D 5/186 |
|           |    |    |         |            | 416/97 R  |
| 2002/0025248 | A1 | * | 2/2002 | Lee       | B23H 9/00 |
|           |    |    |         |            | 415/1     |

(Continued)

OTHER PUBLICATIONS

Office Action issued in related U.S. Appl. No. 14/923,660, filed Oct. 27, 2015.

*Primary Examiner* — Gerald L Sung (74) *Attorney, Agent, or Firm* — Norton Rose Fulbright Canada L.L.P.

(57) ABSTRACT

A turbine component includes a structure having hot and cold surfaces opposite each other; and a plurality of cooling holes extending between the cold and hot surfaces, each of the cooling holes including at least one projection or recess element to form part of a fluid path surface with enhanced in-hole heat convection.

12 Claims, 6 Drawing Sheets

(56) References Cited

U.S. PATENT DOCUMENTS

| | | | |
|---|---|---|---|
| 2002/0094272 A1* | 7/2002 | Fleck | F01D 5/187 416/97 R |
| 2003/0133795 A1* | 7/2003 | Manning | F01D 5/187 416/97 R |
| 2005/0175454 A1* | 8/2005 | Dube | F01D 5/187 416/97 R |
| 2006/0042255 A1* | 3/2006 | Bunker | F01D 25/12 60/752 |
| 2006/0163211 A1* | 7/2006 | Pietraszkiewicz | B23H 9/10 219/69.17 |
| 2009/0304499 A1* | 12/2009 | Strock | F01D 5/186 415/175 |
| 2010/0239412 A1* | 9/2010 | Draper | F01D 5/186 415/115 |
| 2011/0236178 A1 | 9/2011 | Devore et al. | |
| 2012/0117973 A1* | 5/2012 | Gerendas | F23R 3/06 60/755 |
| 2012/0301319 A1* | 11/2012 | Lacy | F01D 5/186 416/97 R |
| 2013/0205791 A1* | 8/2013 | Mongillo, Jr. | F01D 5/186 60/754 |
| 2013/0209229 A1* | 8/2013 | Xu | F01D 5/186 415/115 |
| 2014/0116666 A1 | 5/2014 | Xu | |
| 2014/0338347 A1* | 11/2014 | Gage | F23R 3/06 60/754 |
| 2015/0059357 A1* | 3/2015 | Morgan | F01D 5/081 60/806 |
| 2017/0030200 A1* | 2/2017 | Kruckels | F01D 5/187 |

* cited by examiner

FIG. 7

EFFUSION COOLING HOLES

TECHNICAL FIELD

The application relates generally to gas turbine engines and, more particularly, to cooling holes in turbine components used in such gas turbine engines.

BACKGROUND OF THE ART

Combustors of gas turbine engines are subject to high temperatures and effusion holes can be used to direct air to cool combustor components such as combustor liners, domes and heat shields. Effusion holes extend through the component at a shallow angle with respect to the surface of the component, for efficiently cooling without risking a reduction in combustion temperatures. A typical effusion hole is designed to be a straight cylindrical passage. The length of the hole is dictated by the thickness of the component such as the combustor liner and the angle of the effusion hole with respect to the combustor liner surface. In conventional effusion cooling, heat is removed from, for example the combustor liner, via three mechanisms: backside convection cooling, in-hole convection cooling, and film cooling. Due to the limited thickness of the combustor liner and thus the limited length of the cooling passages formed by the effusion hole, effusion cooling performance is traditionally more dependent on a film cooling mechanism than on the in-hole convection cooling. Nevertheless, it is sometimes desirable to make the overall hole cooling system less dependent on a film cooling mechanism, particularly in regions where the cooling film tends to mix with the hot gas, rather than flowing along the combustor liner surface.

Accordingly, a cooling system having improved cooling holes for enhanced cooling performance is desirable.

SUMMARY

In one aspect, there is provided a turbine component comprising: a structure having a hot surface for being exposed to hot combustion gases and a cold surface for being exposed to cooling air, the hot and cold surfaces being opposite each other; and a plurality of cooling holes extending through a body of the structure from the cold surface to the hot surface, at least one of the cooling holes including at least one projection or recess element to form part of a fluid path surface to enhance in-hole heat convection.

In another aspect, there is provided a combustor liner comprising a hot surface for being exposed to hot combustion gases and a cold surface for being exposed to cooling air, the hot and cold surfaces being opposite each other, and a plurality of cooling holes extending between the cold and hot surfaces, each of the cooling holes extending from an inlet opening defined on the cold surface and terminating at an outlet opening defined on the hot surface, and at least one projection or recess element being provided on an inner surface of each of the cooling holes to enhance in-hole heat convection.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
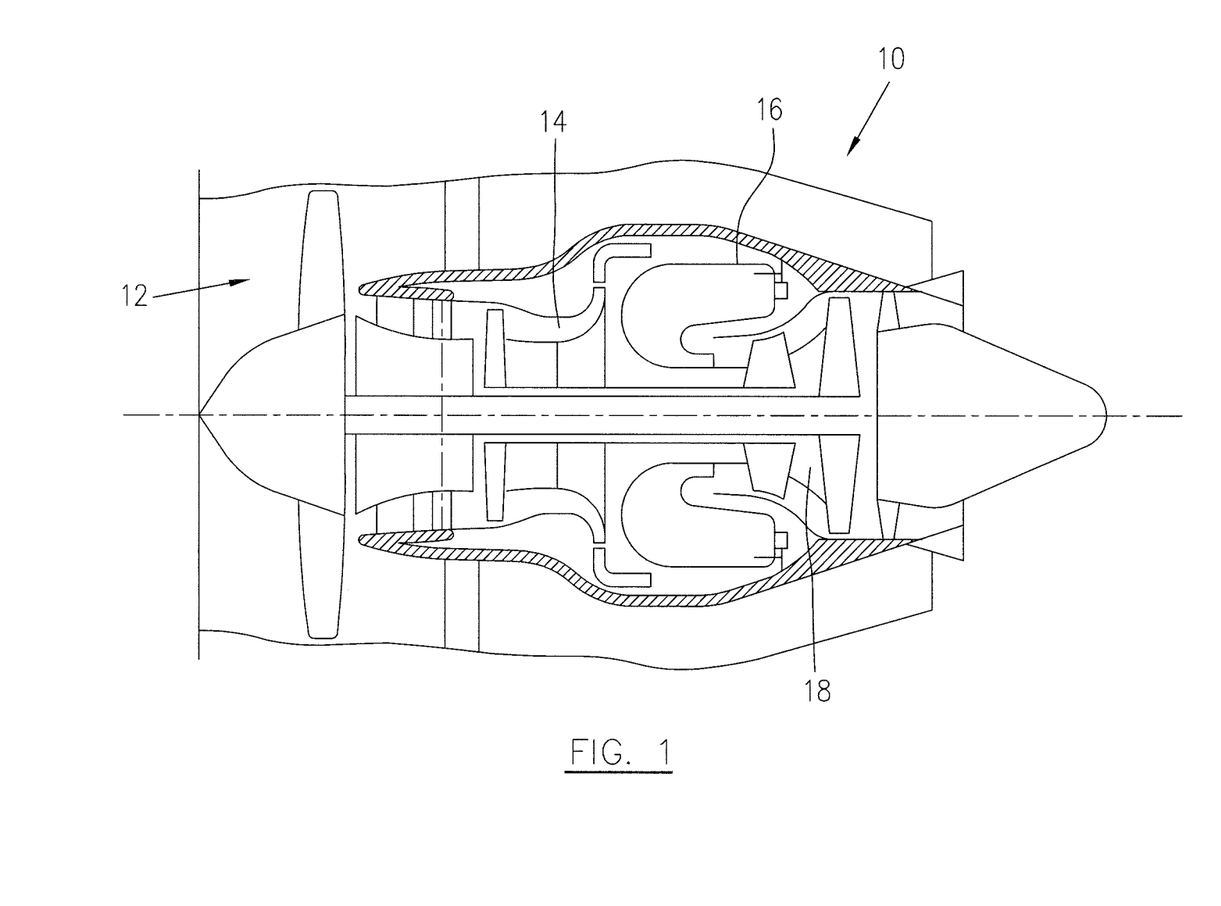
FIG. 1 is a schematic side cross-sectional view of a gas turbine engine as an example illustrating application of the described subject matter.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
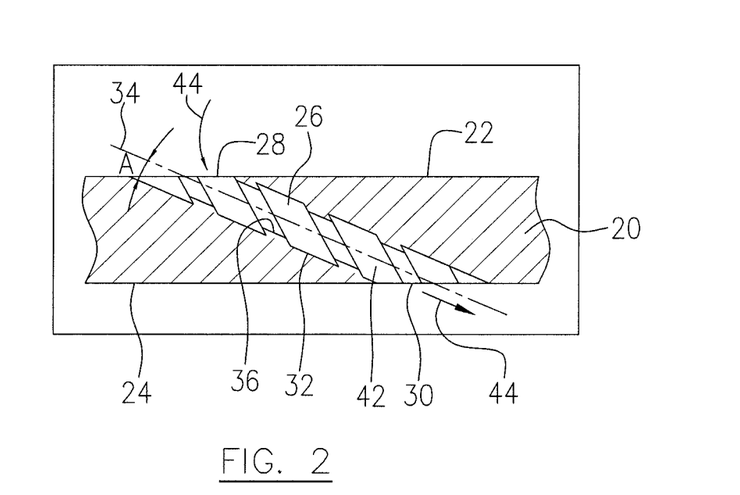
FIG. 2 is a partial cross-sectional view of a combustor liner used in the engine of FIG. 1, showing an exemplary cooling hole extending through the combustor liner and having projection elements therein according to one embodiment.
Figure 3:
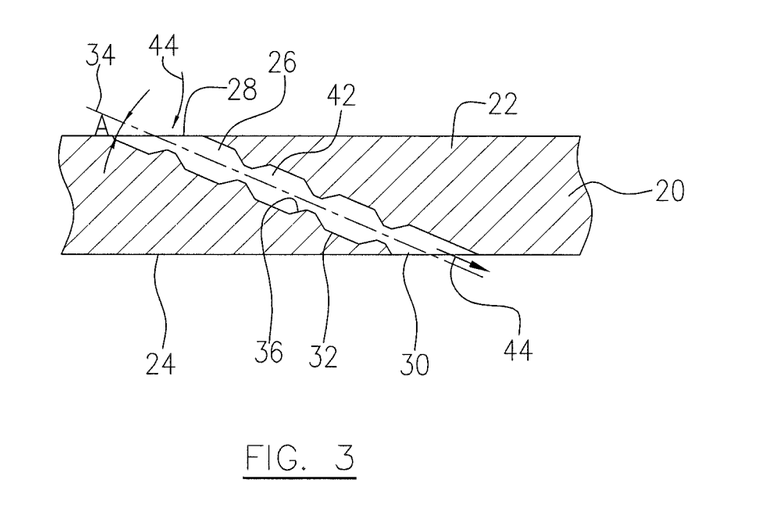
FIG. 3 is a partial cross-sectional view of the combustor liner used in the engine of FIG. 1, showing an exemplary cooling hole extending through the combustor liner and having projection elements therein according to another embodiment.
Figure 4:
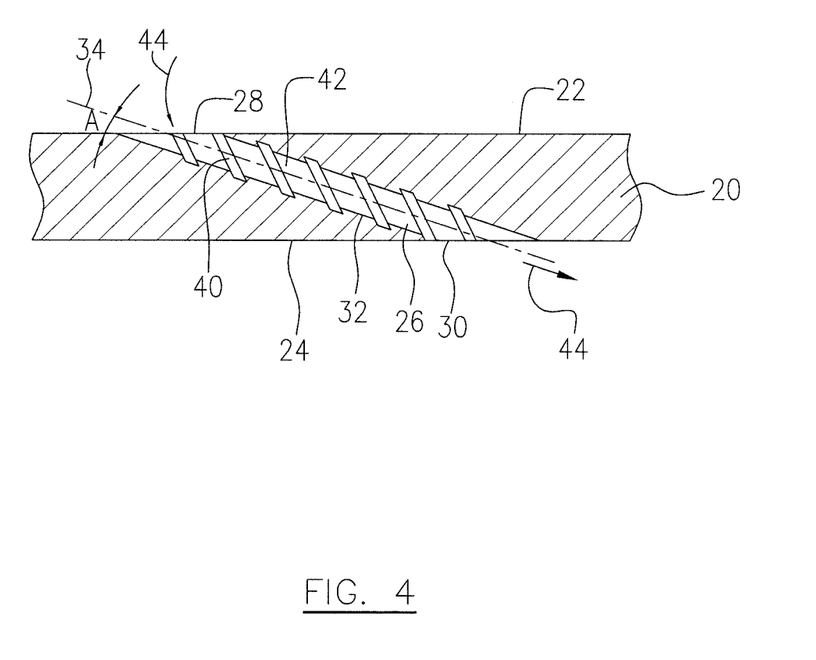
FIG. 4 is a partial cross-sectional view of the combustor liner used in the engine of FIG. 1, showing an exemplary cooling hole extending through the combustor liner and having a recess element therein according to a further embodiment.

It is necessary to cool the combustor in order to provide durability. One possible way to do so is to add effusion holes. FIGS. 2-4, show a cooling hole 26 as an example of an effusion hole. A structure of a turbine component such as a combustor liner 20 which may be of a single skin type, may have a cold surface 22 which is exposed to, for example compressor air surrounding the combustor 16 (see FIG. 1), and a hot surface 24 which is exposed to the hot combustion gases within the combustor 16. The cold and hot surfaces 22 and 24 are opposite each other. A plurality of cooling holes 26 (only one cooling holes is shown in each of the respective figures) each extend from an inlet opening 28 defined on the cold surface 22, through a body of the combustor liner 20, and terminate at an outlet opening 30 defined on the hot surface 24. It should be noted that only one of the cooling holes 26 will be described below in various embodiments.

According to one embodiment the cooling hole 26 defines an inner surface 32 which may be in a cylindrical shape around a central axis 34 of the cooling hole 26, or may be in at least a cylindrical section of the cooling hole 26. The central axis 34 may extend at an oblique angle such as an acute angle A, with respect to the cold surface 22 or the hot surface 24. For example, the angle A may be small, such as an acute angle less than 20 degrees.

The cooling hole 26 according to one embodiment, may include at least one or more projection or recess elements such as a rib 36 (see FIG. 2), ribs 38 (see FIG. 3), or a groove 40 (see FIG. 4) provided on the inner surface 32, to form a fluid path 42 increasing surface areas for contacting the air flow passing through the cooling hole 26.

According to the embodiments illustrated in FIGS. 2 and 3, the projection or recess element such as the rib 36 and ribs 38 may project into the fluid path 42 formed by the cooling hole 26 to reduce a local cross-section of the fluid path 42. Alternatively, according to another embodiment illustrated in FIG. 4, the projection or recess element such as the groove 40 may provide a recess to increase a local cross-section of the fluid path 42 formed by the inner surface 32 of the cooling hole 26. Such projections and/or recesses provided on the inner surface 36 of the cooling hole 26 form part of a fluid path surface, resulting in the desirable increased surface areas of the fluid path 42, in contrast to a similar cooling hole without such projections and/or recesses. The increased surface area of the fluid path 42 creates more inner surface area being in contact with in a cooling air flow (represented by arrows 44) passing through the fluid path 42, which enhances in-hole heat convection from the combustor liner 20 to the cooling air flow 44.

As shown in FIG. 2, the projection or recess element such as the rib 36 which projects from the inner surface 32 of the cooling hole 26 may extend from the inlet opening 28 to the outlet opening 30 in a spiral pattern. In addition to the increased surface area being in contact with the cooling air flow 44, the cooling benefit from a spiralled ribbed cooling hole is that the effective travel distance of the cooling air flow guided by the spiral rib, is increased which allows more heat to be picked up by the cooling air flow 44. This cooling benefit may be achieved when the spiral angle of the rib 36 is shallow enough (less revolutions over the length of the cooling hole 26) to result in minor turbulence intensity in the cooling air flow 44 while passing through the cooling hole 26. If the spiral angle is steep (more revolutions along the length), the turbulence intensity in the cooling air flow 44 is greater since the cooling air flow 44 may "trip" over the ridges formed by the respective revolutions of the spiral rib 36. The greater turbulence intensity in the cooling air flow 44 also allows the cooling air flow 44 to more effectively pick up heat from the combustor liner 20.

As shown in FIG. 3, the projection or recess element such the ribs 38 which project from the inner surface 32 of the cooling hole 26 may be annular around the central axis 34 and may be spaced apart one from another along an axial length of the cooling hole 26. Alternatively, the ribs 38 may not be annular but may be a plurality of discrete rib sections spaced apart one from another in both circumferential and axial directions with respect to the central axis 34 of the cooling hole 26. It will be understood that these embodiments may have a cooling benefit similar to that of the spiralled ribbed cooling hole having a relatively steep spiral angle described above with reference to FIG. 2.

As shown in FIG. 4, according to another embodiment, the projection or recess element such as groove 40 defined on the inner surface 32 of the cooling hole 26 may extend from the inlet opening 20 to the outlet opening 30 in a spiral pattern. Alternatively, the groove 40 in the spiral pattern may be replaced by a plurality of groove sections or recesses on the inner surface 32 of the cooling hole 26, providing a plurality of local recesses on the inner surface 32 separated one from another in both circumferential and axial directions with respect to the central axis 34 of the cooling hole 26, thereby forming the fluid path 42 having an increased surface area with respect to a similar cooling hole without such local recesses.

Figure 5:
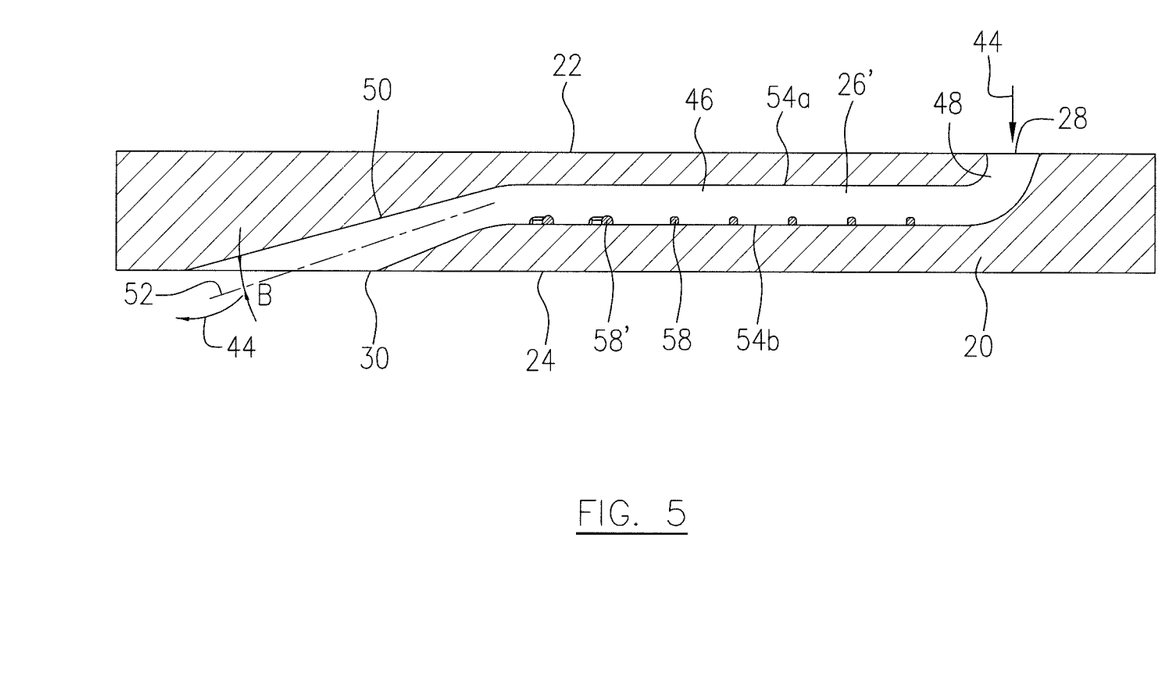
FIG. 5 is a partial cross-sectional view of the combustor liner used in the engine of FIG. 1, showing an exemplary cooling hole extending through the combustor liner and having projection elements therein according to a still further embodiment.
Figure 6:
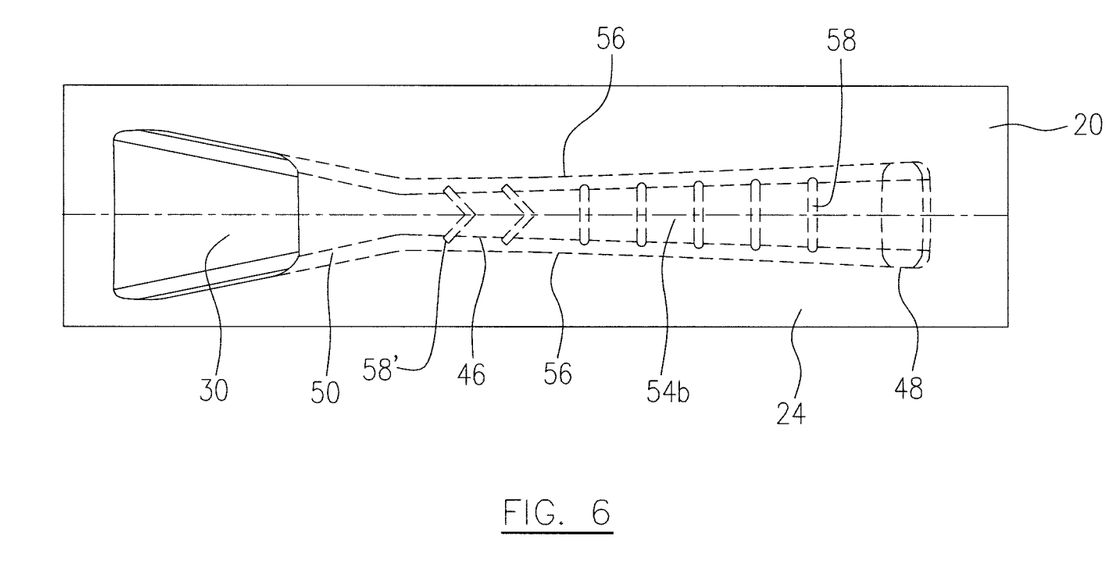
FIG. 6 is a bottom plan view of the cooling hole of FIG. 5, showing an outlet opening defined by a flared section of the cooling hole.
Figure 7:
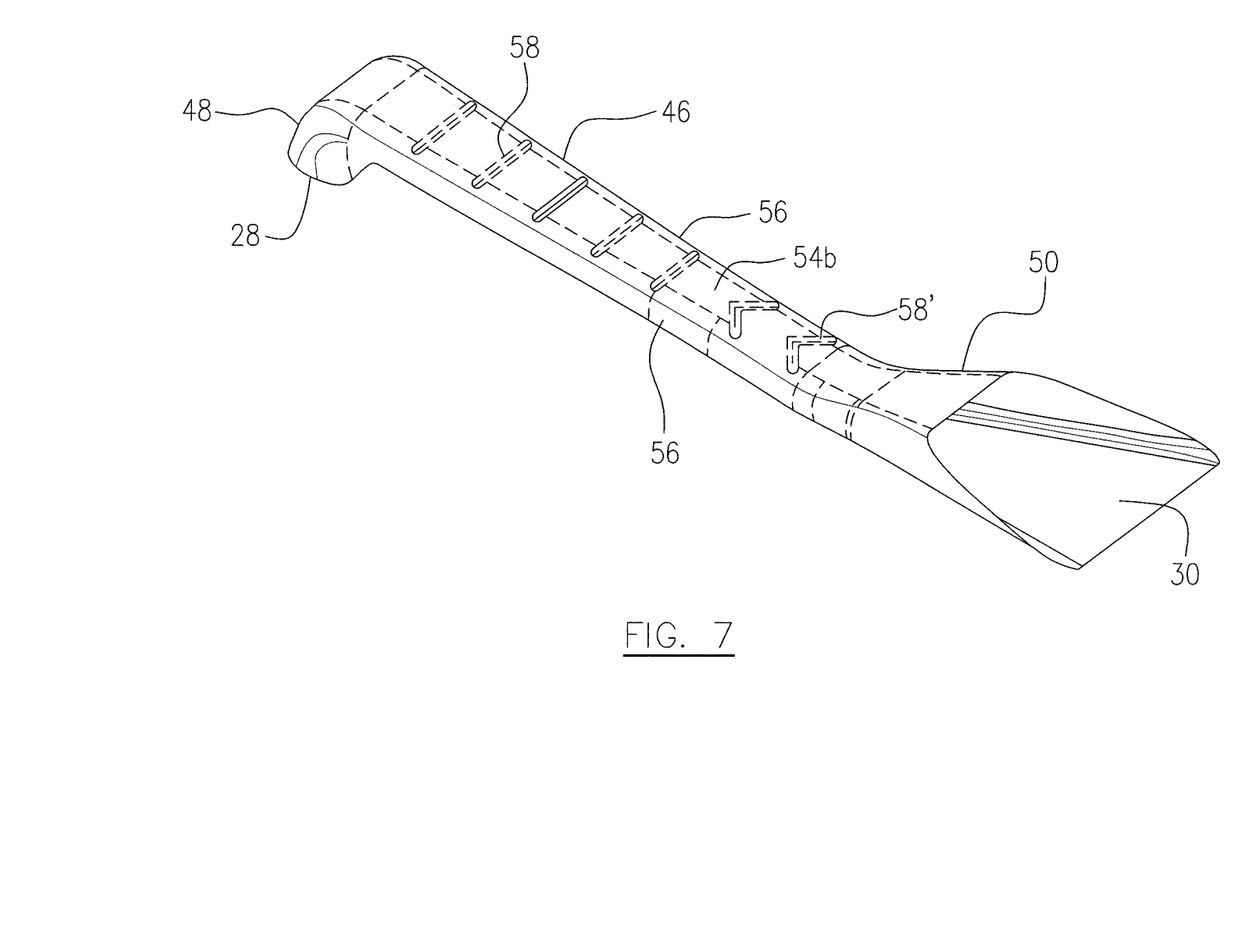
FIG. 7 is an isometric view of the cooling hole.

Referring to FIGS. 5-7, a plurality of cooling holes 26' (only one shown) are provided in a turbine component such as a combustor liner 20, extending through the combustor liner 20 and defining an inlet opening 28 and an outlet opening 30 on the respective cold and hot surfaces 22, 24.

The cooling hole 26', as an example of an effusion hole, may include a straight section 46 substantially parallel to the hot surface 24 or parallel to both the cold and hot surfaces 22, 24. An inlet section 48 may extend from the straight section 46 at one end thereof toward the cold surface 22 to define the inlet opening 28 on the cold surface 22. A flared section 50 may extend and flare from the straight section 46 at the other end thereof toward the hot surface 24 to define the outlet opening 30 on the hot surface 24. The flared section 50 may define a flared section central axis 52 which defines an oblique angle B with respect to the hot surface 24. The oblique angle B of the flared section 50 may be relatively small or shallow such that the cooling air flow 44 discharged from the outlet opening 30 forms a cooling film along the hot surface 24 downstream of the outlet opening 30. The flared section 50 is flared in order to slow down the cooling air velocity such that the cooling air flow 44 flows as a cooling film onto the hot surface 24 of the combustor liner 20 downstream of the outlet opening 30, rather than lifting off the hot surface 24 and mixing with hot gases within the combustor liner 20.

The straight section 46 may include opposed inner surfaces 54a, 54b substantially parallel to the hot surface 24 or parallel to both the cold and hot surfaces 22, 24, extending between opposed sides 56. The opposed sides 56 may extend divergently from the inlet section 48 toward the flared section 50. A plurality (at least one) of projection or recess elements such as ribs 58 may be provided in the straight section 46, for example, projecting into a fluid path of the cooling hole 26' from one of the opposed inner surfaces 54b that faces away from and is adjacent the hot surface 24.

The ribs 58 are generally oriented transverse with respect to the fluid path of the straight section 46. The ribs 58 may be spaced apart one from another along a length of the fluid path of the straight section 46 and may project into the fluid path of the straight section 46.

Optionally, a plurality of V-shaped ribs 58' may also be provided in the straight section 46, projecting into the fluid path of the straight section 46 and extending divergently toward the flared section. The V-shaped ribs 58' may be positioned closest to the flared section 50 to guide the cooling air flow 44 in a flaring fashion into the flared section 50. These V-shaped ribs 58' may function similarly to the spiral ribs 36 in the cooling hole 26 of FIG. 2, and may partially deviate the cooling air flow 44 to increase the travel distance of the air flow 44 and may also partially create turbulence intensity in the cooling air flow 44. The V-shaped ribs 58' may also be spaced apart one from another along a length of the straight section 46 and may be positioned on the inner surface 54b that faces away from and is adjacent the hot surface 24 of the combustor liner 20.

The described embodiments may not only enhance cooling efficiency by improving in-hole heat convection of the cooling holes, but may also make the overall cooling system less dependent on the film cooling mechanism. This may be desirable in regions where the air film tends to mix with the hot gases, rather than staying on the hot surface of the combustor liner, because the cooling system having such cooling holes is enabled to maintain efficient functioning in a large range of flow conditions.

The above description is meant to be exemplary only, and one skilled in the art will recognize that changes may be made to the embodiments described without departing from the scope of the described subject matter. For example, a turbofan gas turbine engine has been taken as an example to illustrate the application of the described subject matter. Nevertheless, the described subject matter may also be applicable to gas turbine engines of other types. The above-described embodiments relate to a combustor liner, however the cooling holes according to the descried embodiments, may also be applicable to other turbine components such as heat shields, turbine shrouds, etc. The above-described embodiments describe and illustrate ribs and grooves as examples of, but do not limit the type of projection or recess elements on the inner surface of cooling holes. Nevertheless, it is understood that other types of local projections or recesses provided on the inner surface of cooling holes such as fins, semi-spherically shaped projections, which create a relative increase in the surface area of the fluid path of the cooling holes may also function as projection or recess elements for enhancing the in-hole heat convection of the cooling holes. Still other modifications which fall within the scope of the described subject matter will be apparent to those skilled in the art, in light of a review of this disclosure, and such modifications are intended to fall within the appended claims.

The invention claimed is:

1. A combustor liner of a gas turbine engine, comprising:
a structure having a hot surface for being exposed to a flow of hot combustion gases and a cold surface for being exposed to cooling air, the hot and cold surfaces being opposite each other; and
a plurality of cooling holes extending through a body of the structure from the cold surface to the hot surface, at least one of the cooling holes including a straight section substantially parallel to the hot surface, an inlet section extending from the straight section toward the cold surface to define an inlet opening on the cold surface, and a flared section extending and flaring from the straight section toward the hot surface to define an outlet opening on the hot surface, at least one of the cooling holes including at least one projection or recess element to form part of a fluid path surface to enhance in-hole heat convection, the at least one of the cooling holes extending from the inlet opening to the outlet opening generally in a same direction as that of the flow of hot combustion gases, the inlet opening upstream of the outlet opening relative to the direction of the flow of hot combustion gases, the at least one of the cooling holes having an inner surface on which the at least one projection or recess element is formed, a cross-sectional area of the at least one of the cooling holes at the inner surface decreasing within the straight section from the inlet opening to the flared section and increasing within the flared section to the outlet opening, the outlet opening being at the end of the flared section, wherein the at least one projection or recess is located upstream of the flared section.

2. The combustor liner as defined in claim 1 wherein a plurality of projections or recess elements including said at least one projection or recess element is provided in a form of a plurality of ribs projecting from the inner surface of the at least one of the cooling holes.

3. The combustor liner as defined in claim 2 wherein the plurality of ribs are spaced apart one from another along a length of the at least one of the cooling holes.

4. The combustor liner as defined in claim 1 wherein at least one of the cooling holes defines a central axis extending at an oblique angle with respect to the hot surface.

5. The combustor liner as defined in claim 1 wherein the at least one projection or recess element is located in the straight section.

6. The combustor liner as defined in claim 1 wherein the straight section comprises opposed inner surfaces substantially parallel to the hot surface, the at least one projection or recess element being positioned on one of the opposed inner surfaces that faces away from and is adjacent the hot surface.

7. The combustor liner as defined in claim 6 wherein a plurality of projection or recess elements including said at least one projection or recess element is provided in a form of a plurality of ribs projecting into a fluid path of the straight section and extending transverse with respect to the fluid path of the straight section.

8. The combustor liner as defined in claim 6 wherein a plurality of projection or recess elements including said at least one projection or recess element is provided in a form of a plurality of V shaped ribs projecting into a fluid path of the straight section and extending divergently toward the flared section.

9. A combustor liner comprising a hot surface for being exposed to hot combustion gases and a cold surface for being exposed to cooling air, the hot and cold surfaces being opposite each other, and a plurality of cooling holes extending between the cold and hot surfaces, at least one of the cooling holes including a straight section substantially parallel to the hot surface, an inlet section extending from the straight section toward the cold surface to define an inlet opening on the cold surface, and a flared section extending and flaring from the straight section toward the hot surface to define an outlet opening on the hot surface, wherein the inlet opening is disposed upstream of the outlet opening relative to a direction of flow of the hot combustion gases over the hot surface, and at least one projection or recess element being provided on an inner surface of the at least one of the cooling holes to enhance in-hole heat convection, the at least one of the cooling holes having the inner surface on which the at least one projection or recess element is formed, a cross-sectional area of the at least one of the cooling holes at the inner surface decreasing within the straight section from the inlet opening to the flared section and increasing within the flared section to the outlet opening, the outlet opening defined at an end of the flared section, wherein the at least one projection or recess is located upstream of the flared section.

10. The combustor liner as defined in claim 9 wherein the at least one projection or recess element comprises a plurality of ribs projecting from the inner surface of the respective cooling hole.

11. The combustor liner as defined in claim 9 wherein the at least one projection or recess element comprises a plurality of ribs located in the straight section.

12. The combustor liner as defined in claim 11 wherein the straight section comprises opposed inner surfaces substantially parallel to the hot surface, the plurality of ribs being positioned on one of the opposed inner surfaces that faces away from and adjacent the hot surface, and wherein said plurality of ribs comprise at least one V shaped rib extending divergently toward the flared section and being positioned closer to the flared section with respect to the remaining ribs.

* * * * *